UNITED STATES PATENT OFFICE.

MALCOLM F. EWEN AND GEORGE H. TOMLINSON, OF CHICAGO, ILLINOIS, ASSIGNORS TO STANDARD ALCOHOL COMPANY, OF NEW YORK, N. Y., A CORPORATION OF MAINE.

PROCESS OF PRODUCING FERMENTABLE SUGAR FROM LIGNOCELLULOSE.

1,032,392.     Specification of Letters Patent.     Patented July 16, 1912.

No Drawing.     Application filed November 12, 1910. Serial No. 592,066.

*To all whom it may concern:*

Be it known that we, MALCOLM F. EWEN, a citizen of the United States, and GEORGE H. TOMLINSON, a subject of the King of England, residing at Chicago, in the county of Cook and State of Illinois, have invented a certain new and useful Improvement in the Process of Producing Fermentable Sugar from Lignocellulose, of which the following is a specification.

Our invention relates to a process of producing fermentable sugar from ligno-cellulose, particularly from comminuted lignocellulose, and has for its object to provide a certain process or series of steps tending to greatly economize the cost of production.

It is well known that fermentable sugar can be produced from ligno-cellulose, such as sawdust, by the application of certain acids thereto, and the treatment of the mixture in what is known as a digester, with heat and under pressure. The capacity of a plant for thus producing fermentable sugar is limited by the capacity of the digesters. The digester is an important and essential part of the apparatus, and also a part which is expensive both to erect and to operate. If the digester is idle for any given period, or its period of activity and effective operation is shortened, to that extent the capacity of the entire plant is reduced and the cost of production increased. It will readily be seen that considerations of this nature are of great importance in view of the fact that we are dealing with very large quantities of ligno-cellulose which produce relatively small percentages of fermentable sugar. It is highly necessary, therefore, that the plant be operated in connection with a process which permits the utilization of the entire plant to the highest degree at all times. It is such limitations as these suggested which have assisted in rendering efforts to commercially produce sugar from ligno-cellulose in the past, partly unsuccessful.

The best processes are those in which a limited amount of acid is applied to a large amount of comminuted ligno-cellulose and, owing to the nature of the material and intimate mixture of the acid therewith which is so highly desirable for uniform and efficient operation, is extremely difficult. The mixture of the acid with the sawdust (which is a form of material very commonly used) has been effected by forcing the acid into the digester after the sawdust has been placed therein, also by forcing the acid into the digester at the time when the sawdust is supplied thereto, also by discharging or spraying the acid into the stream of sawdust as it passes toward or into the digester, and also by spraying the acid into the stream of sawdust as it moves along in the trough or passage or receptacle which leads to the digester; and doubtless there are other methods which have been tried. All these involve, as experience shows, a great deal of loss of time in the active period of the digester. These several methods involve delay because the supply of the material to the digester is retarded because of the necessity of mixing the acid with the sawdust as the latter moves toward the digester, or because of the use of the digester itself as a mixing chamber. It takes time to effect the mixture in question.

Our invention, therefore, comprises first: mixing the acid with the sawdust, apart from the digester, and this may be done in any desired manner, and as much time as desired may be taken. The result will be a body or mass of properly mixed sawdust and acid, which may be stored in open or closed vessels, or carried along at any rate and in any volume toward the digester. During such storage the acid will permeate the particles of sawdust to such degree as materially to increase the yield during the digestion which follows.

Our invention comprises second: discharging quickly and in a large mass or by a large stream, the entire required amount of sawdust and acid into the digester, without delay incident to mixing, or retarding the stream because of mixing. In ordinary practice it frequently requires as much as twenty minutes to fill the digester with a comparatively slow moving or small stream of mixed material or material to be mixed in the digester; whereas, if the completely and satisfactorily mixed sawdust can be discharged *en masse* into the digester, the latter can be filled in as little as five minutes. The difference between these two periods of filling is of immense importance in the ordinary operation of such a plant, as will be seen when it is remembered that the digesting operation proper requires about forty minutes' time. The total operation under ordinary conditions, therefore, from beginning to fill to discharging, would be about sixty minutes; whereas, under the present process, it is about forty-five minutes. Under such circumstances, the increase would be twenty-five per cent. efficiency.

Our invention comprises third: the heating of the sawdust, if that should be found, under the conditions of any particular plant, desirable before it is introduced into the digester. When the sawdust is introduced in a heated state the conversion can begin at once, and the time of treatment in the digester is correspondingly reduced.

The advantage of our process is further shown by the fact that the digester itself has no opportunity to cool off, for, in a continuously operating plant, the moment the digester discharges its digested material it should, while in its heated condition, be instantly re-charged and set in motion to carry out the digesting process on the new charge. The cooling of the digester incident to the slow process of filling the same under the old methods employed, is disastrous to a certain extent, because it is the cooling and heating of the digester which tends to destroy it. As experience has shown heretofore, these digesters are made of various kinds of materials, and heating and cooling tend to cause the materials of which the digester is composed to break and leak; whereas, under the conditions of our process, they remain intact. The time required for mixing the sawdust and the acid, under the conditions of our process, may be as much as convenience may require, but in no event does it affect the time of operation in the digester,—the two processes being entirely separate. The digester, in ordinary practice, is of course hot at the time when it has discharged its digested contents, and is ready to receive a new charge. Being hot, it is desirable to introduce the charge, comminuted ligno-cellulose, which carries with it, to a great degree, the oxygen desirable to aid in carrying on the digesting process as quickly as possible so as to prevent the heat from expelling such oxygen so carried by the comminuted ligno-cellulose. It appears, therefore, that the conditions, so far as the presence of oxygen is concerned, are improved by the quick introduction of the comminuted ligno-cellulose as distinguished from its slow introduction by a feeble stream. If, on the other hand, the sawdust be discharged *en masse* or quickly into the digester without having been mixed with the acid, while the supply of oxygen may be adequate, the difficulties of effecting the mixture within the digester, and the delays incident thereto, then confront us.

We claim—

1. The process of producing fermentable sugar from comminuted ligno-cellulose, which consists in mixing the ligno-cellulose with a limited amount of a hydrolyzing acid, apart from the digester, then discharging the mixed acid and ligno-cellulose into the digester quickly, then closing the digester and subjecting the contents to the required heat and pressure until the sugar has been formed, then discharging the contents from the digester and recovering the sugar in any desired manner.

2. The process of producing fermentable sugar from comminuted ligno-cellulose, which consists in mixing the ligno-cellulose with a limited amount of a hydrolyzing acid, apart from the digester, then discharging the mixed acid and ligno-cellulose into the digester while the latter is heated, quickly, then closing the digester and subjecting the contents to the required heat and pressure until the sugar has been formed, then discharging the contents from the digester, then filling the heated digester with another charge of the mixed ligno-cellulose and acid, delivered thereto quickly, and so continuing the process.

3. The process of producing fermentable sugar from comminuted ligno-cellulose, which consists in mixing the ligno-cellulose with a limited amount of a hydrolyzing acid, apart from the digester, then discharging the mixed acid and ligno-cellulose into the digester quickly, then closing the digester and subjecting the contents to the required heat and pressure until the sugar has been formed, then discharging the contents from the digester and recovering the sugar in any desired manner,—the mixture of ligno-cellulose and acid being heated before it is introduced into the digester.

4. The process of producing fermentable sugar from comminuted ligno-cellulose, which consists in mixing the ligno-cellulose with a limited amount of a hydrolyzing acid, apart from the digester, then discharging the mixed acid and ligno-cellulose into the digester while the latter is heated, quickly, then closing the digester and subjecting the contents to the required heat and pressure until the sugar has been formed, then discharging the contents from the digester, then filling the heated digester with another charge of the mixed ligno-cellulose and acid, delivered thereto quickly, and so continuing the process,—the mixture of ligno-cellulose and acid being heated before it is introduced into the digester.

5. In a process of producing fermentable sugar from comminuted ligno-cellulose or other cellulosic raw material by digestion with a hydrolyzing agent, the step which consists in preheating the mass before introducing it into the digester.

MALCOLM F. EWEN.
GEORGE H. TOMLINSON.

Witnesses:
ERNEST S. BALL,
A. O. WENTE.